United States Patent
Helmer

[11] 3,791,232
[45] Feb. 12, 1974

[54] ADJUSTABLE BALL LEAD NUT

[76] Inventor: Jesse Norman Helmer, Rt. 1, Box 241, Lake City, Mich. 49651

[22] Filed: Feb. 12, 1973

[21] Appl. No.: 332,011

Related U.S. Application Data

[63] Continuation-in-part of Ser. No. 157,377, June 28, 1971, abandoned.

[52] U.S. Cl.................... 74/459, 74/424.8, 74/441
[51] Int. Cl. ..................... F16h 55/28, F16h 55/18
[58] Field of Search ........ 74/441, 459, 424.8, 89.15

[56] References Cited
UNITED STATES PATENTS

| | | | |
|---|---|---|---|
| 3,253,478 | 5/1966 | Ziver | 74/424.8 R |
| 3,170,336 | 2/1965 | Bohnhoff | 74/424.8 R |

*Primary Examiner*—Charles J. Myhre
*Assistant Examiner*—Frank H. McKenzie, Jr.

[57] ABSTRACT

In combination, an adjustable ball lead nut and a ball lead screw having complementary channels or grooves cooperating to define a helical duct, an adjustment disc mounted at one end of the nut and adapted to rotate with respect thereto over a limited angle, the lead nut and adjustment disc being provided with complementary channels or grooves cooperating to define an adjustment loop duct being in series with the helical duct, and a plurality of ball bearings disposed within the ducts, rotation of the adjustment disc in one direction causing the adjustment loop duct to decrease in length, thereby bringing the ball bearings into mutual engagement and providing compensation for wear of said ball bearings. Additional structure is provided to facilitate the movement of ball bearings through the various ducts.

12 Claims, 12 Drawing Figures

3,791,232

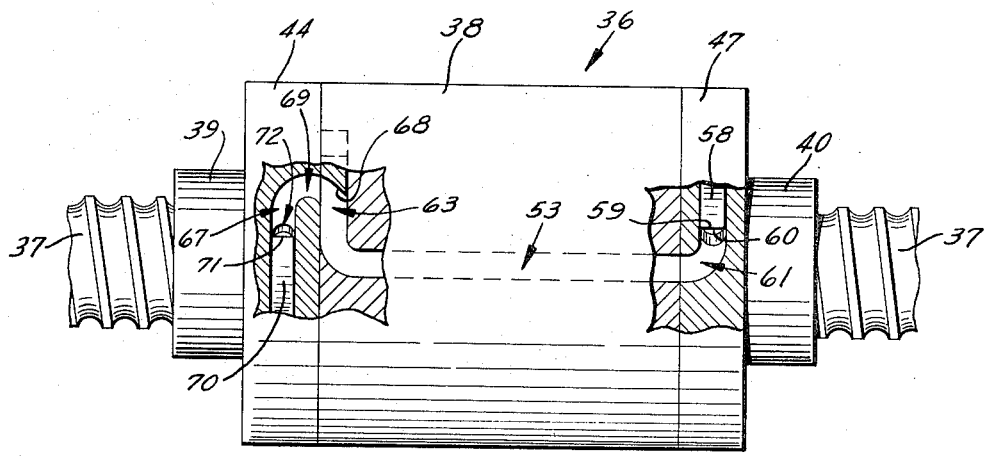
figure 9
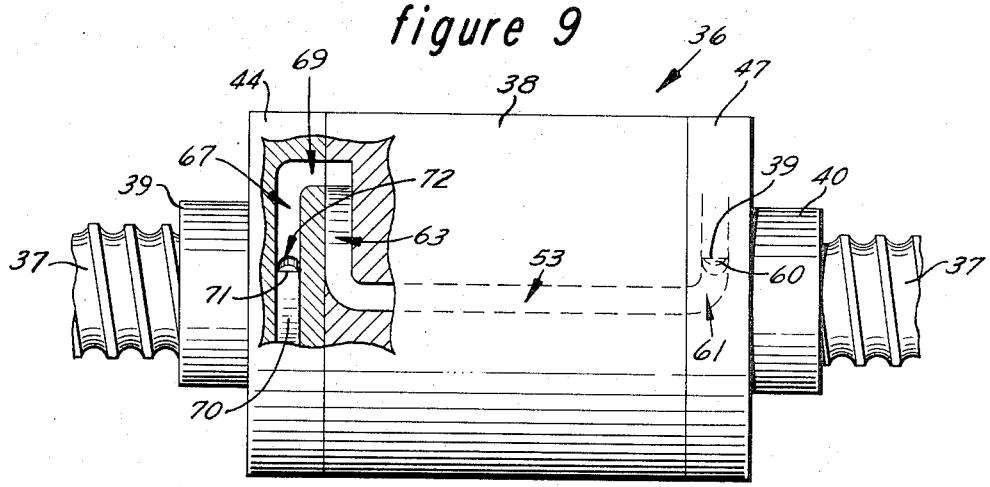
figure 10
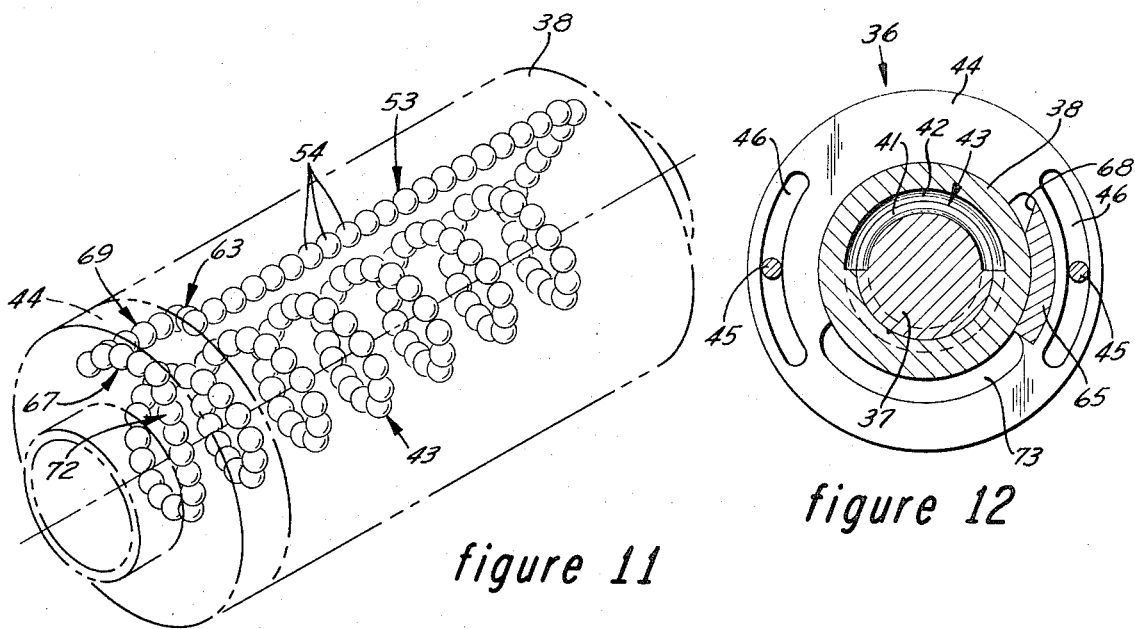
figure 11
figure 12

ADJUSTABLE BALL LEAD NUT

BACKGROUND OF THE INVENTION

This application is a continuation-in-part of pending application Ser. No. 157,377, filed June 28, 1971 now abandoned by Jesse Norman Helmer.

FIELD OF INVENTION

The present invention relates to machine lead screw and nut apparatus, and is more particularly concerned with a machine lead screw and nut combination provided with complementary channels or grooves defining a helical duct and having a plurality of ball bearings disposed within the duct.

PRIOR ART

Apparatus of the type described is generally known in the art. The use of ball bearings to provide engagement between a nut and a lead screw provides a positive engagement with low friction. However, such apparatus has the disadvantage that when the ball bearings wear they become smaller and considerable backlash or sloppiness develops in the engagement between the lead screw and nut. Some attempts have been made to remedy the situation. For example, U. S. Pat. No. 3,053,105 discloses a means for compensating against wear of such devices utilizing a resilient disc or annulus. Further, in U. S. Pat. No. 3,141,349 attempts are made to compensate for wear by utilizing a two-member nut having an elastomeric inner face, the two members being compressible together to take up slack caused by ball bearing wear. Such compensation means have not proved to be entirely satisfactory, since in one case positive linear force maintaining the ball bearings in place is not achieved, and in the other case the grooves of the nut and lead screw are offset, causing undue wear on one side of each channel.

OBJECTS OF THE INVENTION

It is an object of the invention to provide a lead screw and nut combination utilizing ball bearings for providing low friction engagement of the nut and lead screw. It is a further object to provide an apparatus of the type described having novel means for compensating for ball bearing wear. It is an additional object to provide such an apparatus having means provided for facilitating movement of the ball bearings along the various ducts. It is still a further object to provide a structure which is more easily machined and assembled than prior art structures.

According to the invention, a lead screw and nut combination is provided utilizing ball bearings for engagement, and having an adjustment disc rotatably mounted on the nut, the adjustment disc having ducts provided therein to provide an adjustable loop duct of ball bearings in series with the main duct of ball bearings which increases or decreases in length as the disc is rotated in one direction or the other. Rotation of the disc in direction of decreasing length causes the adjustment loop to shorten until the ball bearings throughout the apparatus engage each other closely, thereby compensating for wear. Additional structure in the form of tangentially oriented ducts and cooperating bosses to improve the operation of the apparatus, and discontinuous annular ducts to facilitate fabrication of the apparatus are also provided.

BRIEF DESCRIPTION OF THE DRAWING

In the drawings,

FIG. 9 is a top view partly broken away and partly in cross-section of the device shown in FIGS. 4–8, and illustrating the apparatus with the adjustment disc in one rotative position.

FIG. 10 is a top view of the apparatus, partly broken away and partly in cross-section of the apparatus shown in FIGS. 4–8 and illustrating the adjustment disc in another rotative position.

FIG. 11 is a diagrammatic perspective view showing the general outline of the apparatus in broken lines, and showing the configuration of the ball bearing-containing channels, and FIG. 12 is a cross-sectional view taken at the line XII—XII of FIG. 4, looking in the direction of the arrows.

DESCRIPTION OF THE PREFERRED EMBODIMENTS

Figure 1:
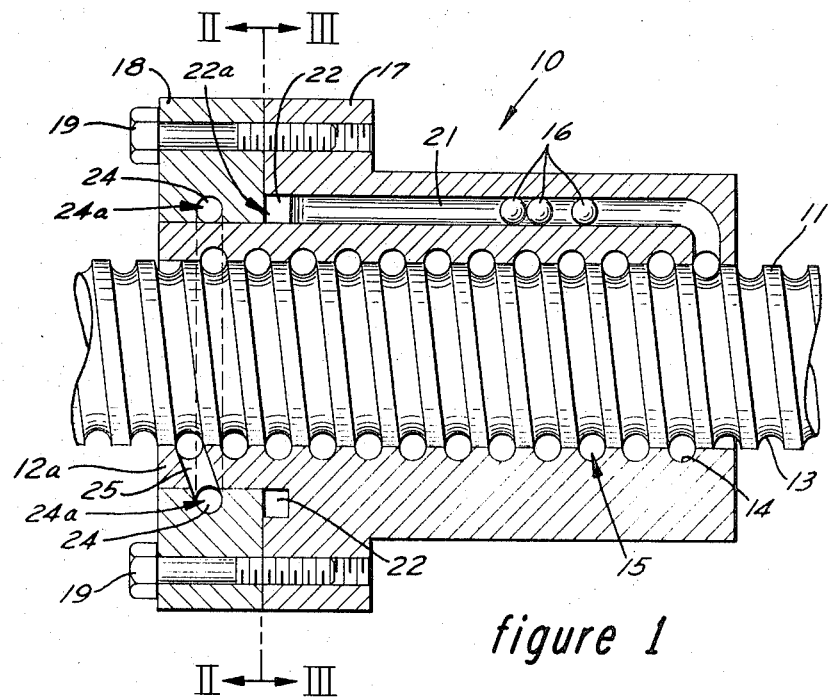
FIG. 1 is a sectional view of one embodiment of the ball lead screw and nut combination of the invention, taken at the line I—I of FIG. 3, looking in the direction of the arrows.
Figure 2:
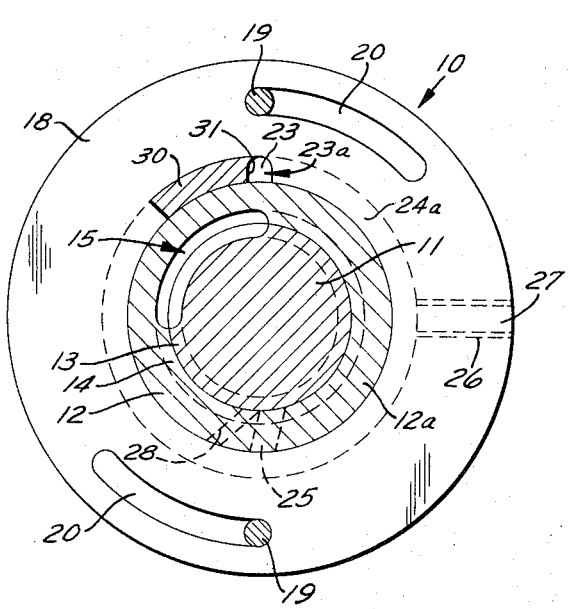
FIG. 2 is a cross-sectional view taken at the line II—II of FIG. 1, looking in the direction of the arrows.
Figure 3:
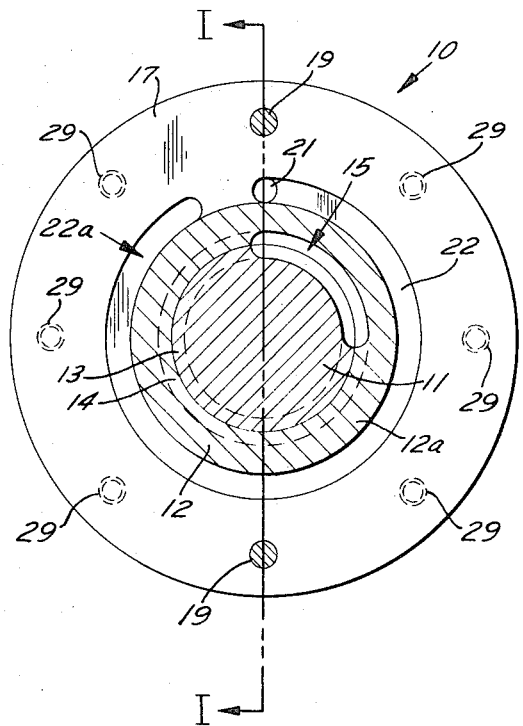
FIG. 3 is a cross-sectional view taken at the line III—III of FIG. 1, looking in the direction of the arrows.

Referring to FIGS. 1–3, a ball nut and lead screw assembly 10 is shown comprising a lead screw 11 and a cylindrically shaped lead nut 12. The surface of the lead screw 11 is provided with a helical channel or groove 13 and the lead nut 12 is provided with a complementary helical channel or groove 14. The helical channels 13 and 14 cooperate to define a helical duct 15 adapted to receive a plurality of ball bearings 16. The nut 12 is provided with a flange 17. An annular adjustment disc 18 is rotatively mounted on an axial extension 12a of the nut 12 and against the face of the flange 17 by means of bolts 19 extending through arcuate slots 20 provided in the adjustment disc, and threadedly engaged in the flange. The adjustment disc 18 is adapted to be rotated through an arc defined by the length of the arcuate slots 20, and to remain fixed at any desired rotative position when the bolts 19 are tightened.

At the remote end of the lead nut 12 the helical duct 15 is connected to a longitudinal transfer duct 21 which is connected at its other end to a discontinuous annular channel 22 coaxially positioned with respect to and provided in the face surface of the nut 12, and having one end connected to the duct 21, which channel cooperates with the face of the adjustment disc 18 to define an annular duct 22a. An arcuate detent 30 extends axially from the adjustment disc 18 and rides in the channel 22 to provide an adjustable limit defining the length of the adjustable duct 22a. A lip 31 is provided for funnelling ball bearings 16 into an aperture 23 in the adjustment disc 18 which leads to a transverse duct 23a. A discontinuous annular channel 24 is provided on the inner axial surface of the adjustment disc 18 which cooperates with the surface of the axial extension 12a to define an annular duct 24a connected at one end to the transverse duct 23a and at the other end to a connecting duct 25 which in turn is connected to the main helical duct 15, and juxtaposed with respect to the annular duct 22a. The channels and ducts within the lead nut 12 and adjustment disc 18 cooperate to form an adjustable loop duct whose length may be varied by rotating the adjustment disc 18, as will be explained in greater detail below.

In operation, all the ducts are filled with ball bearings until the apparatus is completely filled. A ball bearing filling hole 26 is provided for introducing ball bearings into the ducts and maintained closed by a screw 27. The adjustment disc 18 is then rotated until the ball bearings 16 snugly engage each other. As the lead screw is turned with respect to the lead nut, the ball bearings leave the main helical duct at one end and enter at the other end. They continue to pass through all the ducts which are arranged in series, the longitudinal transfer duct, the adjustable loop duct, and back through the connecting duct to the other end of the main helical duct. When the screw is turned in an opposite direction, the direction of motion of the ball bearings is reversed. However, the ball bearings continue in engagement with each other. When wear takes place and the ball bearings no longer engage each other, the adjustment disc is further rotated to shorten the adjustment loop duct and to place the ball bearings once again in engagement with each other. A dowel pin or screw 28 is provided at each end of the nut to guide the ball bearings into or out of the longitudinal transfer duct 21 at one end and into or out of the connecting duct 25 at the other end from the main channel. Additional threaded holes 29 are provided for mounting the adjustment disc in different rotative position ranges.

Figure 4:
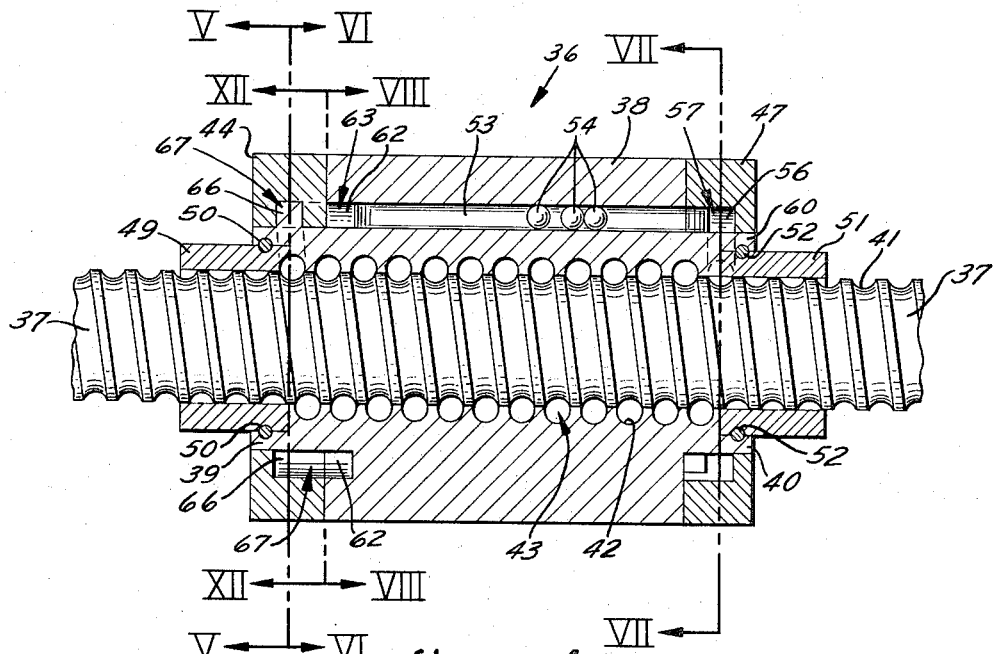
FIG. 4 is a sectional view of another embodiment of the invention.

Referring to FIGS. 4-12, a somewhat modified form of the invention is illustrated comprising a lead nut and lead screw assembly 36 having a lead screw 37, a cylindrical lead nut 38 having annular axial extensions 39 and 40. The lead screw 37 is provided with a helical channel 41 and the lead nut 38 is provided with a complementary helical channel 42 cooperating with the helical channel 41 to define a helical ball bearing main duct 43. As can be seen in FIG. 4, the channel 42 provided in the lead nut is deeper than the channel 41 provided in the lead screw. As a result, the ball bearings more readily roll into the connecting ducts of the lead nut to be described.

An adjustment disc 44 is rotatably mounted at one end of the lead nut 38 on the axial extension 39 and is maintained thereon by means of bolts 45 positioned in arcuate slots 46 provided in the adjustment disc 44 and threadedly engaged in apertures provided at the periphery of the face of the lead nut 38. The adjustment disc 44 is rotatable with respect to the lead nut through an arc defined by the length of the arcuate slots 46.

An annular disc 47 is mounted at the other end of the nut 38 over the axial extension 40 and is affixed to the nut by means of bolts 48 mounted through apertures provided in the disc and threadedly engaged in threaded holes provided in the nut.

As shown in FIG. 4, in order to limit the travel of the ball bearings at the ends of the helical duct 43, the axial extension 39 is recessed to permit a limiting ring 49 to be positioned therein and retained by means of pins or dowels 50 placed through apertures in the axial extension 39 and engaging grooves provided in the limiting ring 49. Similarly, the axial extension 40 is recessed to receive a limiting ring 51 which is similarly maintained in place by pins or dowels 52.

Figure 7:
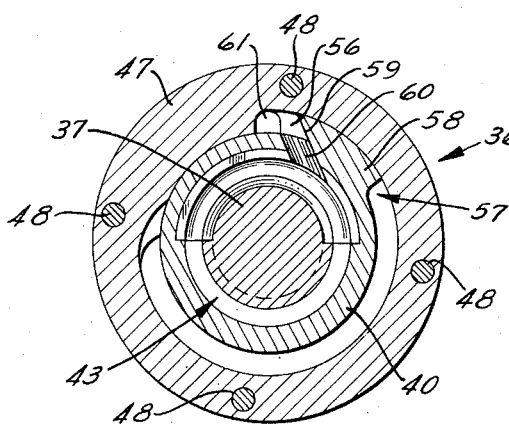
FIG. 7 is a cross-sectional view taken at the line VII—VII of FIG. 4, looking in the direction of the arrows.

As shown in FIG. 4, a longitudinal transfer duct 53 is utilized to transfer ball bearings 54 from one end of the helical duct 43 to the other. The ball bearings are transferred from the end of the transfer duct 53 adjacent the annular disc 47 to the helical duct 43 by means of a connecting duct system provided in the annular disc 47. As shown in FIGS. 4 and 7, the annular disc is provided with a discontinuous annular channel 56 provided on the axial inner surface of the disc, and cooperating with the outer surface of the axial extension 40 to define a discontinuous annular duct 57. The axial extension 40 is provided with a radially extending boss 58 slidably positioned within the annular duct 57. At the leading edge 59 of the boss 58 is a duct 60 connected at one end to the annular duct 57 and at the other end entering the helical duct 43 tangentially. At the upper end of the duct 57 is an elbow duct 61 connecting the duct to the longitudinal transfer duct 53.

Figure 8:
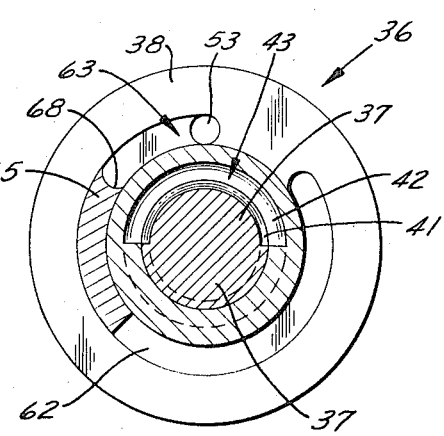
FIG. 8 is a cross-sectional view taken at the line VIII—VIII of FIG. 4, looking in the direction of the arrows.

As shown in FIGS. 4 and 8, the longitudinal transfer duct 53 is connected at one end to a discontinuous annular channel 62 provided in the face of the lead nut 38 which cooperates with the face of the adjustment disc 44 to provide a discontinuous annular duct 63 connected at one end to the end of the transfer duct 53. An arcuate detent 65 extends axially from the adjustment disc 44 and rides in the channel 62, providing an adjustable limit for the other end of the duct 63.

Figure 5:
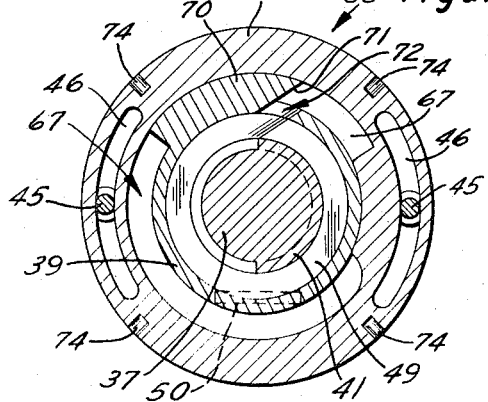
FIG. 5 is a cross-sectional view taken at the line V—V of FIG. 4, looking in the direction of the arrows.
Figure 6:
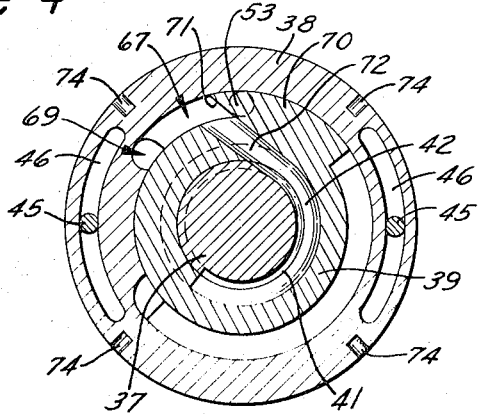
FIG. 6 is a cross-sectional view taken at the line VI—VI of FIG. 4, looking in the direction of the arrows.

As shown particularly in FIGS. 9 and 10, the adjustment disc 44 is also provided with a discontinuous annular channel 66 at its inner axial surface which cooperates with the outer surface of the axial extension 39 to provide a discontinuous annular duct 67 similar to the annular duct 57 provided in the annular disc 47. As shown in FIG. 12, the arcuate detent 65 is provided with a lip 68 which guides ball bearings 54 from the annular duct 63 to a U-form transverse duct 69 (shown in detail in FIGS. 9 and 10), and into the annular duct 67. The axial extension 39 is provided with an arcuate boss 70 which extends into and rides in the annular channel 67 thereby defining one end of the annular duct 67. As shown in FIGS. 5 and 6, at the leading edge 71 of the boss 70 a duct 72 is connected to the channel 67 and extends tangentially to and connects with the helical duct 43 at one end thereof.

A recess 73 is provided in the adjustment disc 44 to permit the boss 70 to enter and engage the annular channel 66 when the adjustment disc is assembled onto the nut. A similar recess may be provided in the annular disc 47 to permit the boss 58 to enter the annular channel 56 for assembly.

FIG. 11 illustrates the spacial arrangement of the ball bearing ducts. As the lead screw 37 is turned with respect to the lead nut 38, the ball bearings 54 leave the main helical duct 43 at one end and enter at the other. When the nut is turned in one direction, for example, the ball bearings at the remote end of the nut travel through the tangential duct 60 into the transfer duct 53 where they proceed until they enter the annular duct 67, continue through the transverse duct 69 and into the annular duct 67 provided in the adjustment disc 44. They then are guided by the boss 70 into the tangential duct 72 and back into the helical duct 43.

FIGS. 9 and 10 illustrate the principle of operation of the present invention. During operation, wear is encountered with respect to the ball bearings and even the channel in which they are disposed between the nut and lead screw. As a result the ball bearings do not touch each other and there may be considerable play or backlash between the nut and the lead screw. According to the invention such wear is compensated for by rotating the adjustment disc 44 and shortening the adjustable loop duct formed by ducts 63, 69, and 67 and thereby the overall length of the duct in which the ball bearings travel, thereby placing the ball bearings in close engagement with each other.

Referring to FIG. 10, a position of the adjustment disc with respect to the nut is shown in which the adjustment loop duct formed by cooperation by the ducts of the adjustment disc and nut is long. This is the position before initial adjustment is made or before adjustment is made to compensate for wear. To provide such compensation the adjustment disc is rotated in a direction to shorten the loop duct and until the ball bearings closely engage each other. Such a position is shown in FIG. 9. The bolts 45 are then tightened. After further use and further wear, the adjustment disc may be once again rotated to shorten the loop still further, thereby shortening the overall length of the ball bearing duct until all the ball bearings are again in close engagement. To facilitate rotation of the adjustment disc, spanner wrench notches 74 may be provided as shown in FIGS. 5 and 6.

The apparatus is assembled by placing the lead nut over the lead screw, and with either the adjustment disc 44 or annular disc 47 in place. The ducts are then completely filled with ball bearings. The remaining disc is then mounted by placing the boss of the respective axial extension through the recess 73, and rotating the respective disc to engage the boss in the respective annular channel. The disc is then affixed to the nut by means of bolts. The length of the adjustment loop is then reduced until all the ball bearings are in close engagement, the bolt then being tightened in place.

The adjustable lead screw and nut apparatus according to the present invention has several advantages over prior art lead screw and nut apparatus utilizing ball bearings. The primary advantage is that the apparatus provides a very quick and effective adjustment for wear by rotation of the adjustment disc. Because of the nature of the arrangement, a substantial shortening of the overall ball bearing duct may be accomplished which can compensate for a large degree of wear. In prior art arrangements, only small amounts of wear could be compensated for. Further, the present apparatus provides a more positive adjustment because the ball bearings are maintained in steel-to-steel adjustment, thereby obviating the sloppiness or backlash which might be introduced by utilizing resilient discs to take up the slack space when ball bearing wear is encountered. Further, the apparatus can be effectively and accurately operated over long periods of time without the necessity for disassembly.

A further advantage of the invention is provided by the structure in which the adjustment disc 44 and the annular disc 47 are both separate structures. This permits the transfer ducts and adjustment ducts to be easily provided by machining the annular structures. The use of an arcuate boss cooperating with a tangential duct for feeding or unloading ball bearings with respect to the axial duct facilitates their transfer back and forth and prevents the jamming up of ball bearings which results when normally directed ducts are utilized. Moreover, the tangential edge of the boss facilitates feeding ball bearings into the longitudinal transfer duct at one end and into the annular duct 63 at the other. Further improvements in structure result from the use of the limiting rings which are recessed within the axial extensions, thereby facilitating the machining of the structure and providing a readily adjustable limit for forcing ball bearings out of the axial duct and into the tangential ducts.

It is to be understood that the invention is not to be limited to the exact details of structure and operation shown and described, as obvious modifications and equivalents will be apparent to one skilled in the art.

I claim:

1. In combination, an adjustable ball lead nut and a ball lead screw having complementary helically arranged grooves cooperating to define a helical ball bearing duct, an adjustment member rotatably mounted at one end of said nut, a return duct connecting one end of said helical duct with the other, and adapted to have a plurality of ball bearings disposed in said helical duct and said return duct, portions of said return duct being disposed in said adjustment member and the adjacent end of said nut, said portions cooperating to define an adjustable loop duct and being so disposed that rotation of said adjustment member in one direction shortens said adjustment loop and causes said ball bearings to become positioned in close mutual engagement, thereby compensating for wear.

2. The combination according to claim 1, wherein said adjustable loop duct comprises an annular channel provided in one end of said nut cooperating with a surface of said adjustment member to define a first discontinuous annular duct, a transverse duct provided in said adjustment member and communicating at one end with said first annular duct, and a second discontinuous annular duct provided in said adjustment member connected at one end with said transverse duct, said second annular duct being juxtaposed with respect to said first annular duct, the other end of said second annular duct being connected to a connecting duct which in turn is connected to one end of said helical duct.

3. The combination according to claim 2, wherein said return duct includes a longitudinally disposed duct communicating at one end with the remote end of said helical duct and communicating at the other end with said first annular duct.

4. The combination according to claim 1, wherein said lead nut is provided with a filling duct communicating with said helical duct for filling said helical duct with ball bearings, and having means provided for closing said filling duct to prevent ball bearings from escaping through said filling duct during operation.

5. The combination according to claim 1, wherein an angularly positioned boss is provided at each end of said lead nut positioned to guide ball bearings leaving and entering said helical duct in a continuous stream.

6. The combination according to claim 1, wherein said adjustment member is disc-form and mounted on said lead nut by means of screws extending through arcuate slots provided in said adjustment member and threadedly engaged in said lead nut.

7. The combination according to claim 6, wherein the inner face of said adjustment member is provided with an arcuate detent extending axially into the annular channel provided in one end of said nut and serving as an adjustable limit for said first annular duct, and said detent is provided at one end with a lip for guiding ball bearings into said transverse duct.

8. The combination according to claim 7, wherein said lead nut is provided with axial extensions wherein said adjustment member is rotatably mounted on an axial extension at one end, and having at the other end an annular disc rotatably mounted on the other of said axial extensions, the inner axial surface of said annular disc being provided with a discontinuous annular channel cooperating with the surface of said axial extension to define a discontinuous annular duct, said axial extension having an arcuate boss extending radially into said annular channel and providing a limit for said annular duct, a duct provided in said axial extension having an opening adjacent one end of said boss communicating with said annular duct and being tangentially positioned with respect to and communicating with one end of said helical duct, and duct means connecting said discontinuous annular duct with said longitudinally disposed duct.

9. The combination according to claim 7, wherein said second annular duct comprises a discontinuous annular channel provided on the inner axial surface of said adjustment member cooperating with the outer surface of the axial extension on which said adjustment member is rotatably mounted, said axial extension being provided with an arcuate boss extending radially into and riding in said annular channel, and providing a limit for said channel, and a duct having an orifice immediately adjacent to one end of said boss and extending in said axial extension tangentially to and communicating with one end of said helical duct.

10. The combination according to claim 7, wherein said axial extensions are recessed to receive limiting rings mounted therein to provide limits for said helical duct, and preventing said ball bearings from leaving said lead nut during operation.

11. The combination according to claim 1, wherein the helically arranged grooves provided in said lead nut are deeper than the helically arranged grooves provided in said lead screw.

12. In combination, an adjustment ball lead nut and a ball lead screw having complementary helically arranged grooves cooperating to define a helical ball bearing duct, a longitudinal transfer duct for transferring ball bearings from one end of said helical duct to the other when said lead screw is rotated with respect to said lead nut, and means for connecting an end of said helical duct to said longitudinal transfer duct, comprising an axial extension provided at an end of said lead nut, an annular disc rotatably mounted on said axial extension having means for being affixed to said nut, the annular disc having a discontinuous annular channel provided at its inner axial surface cooperating with the surface of said extension to define a discontinuous annular duct, said axial extension having an arcuate boss extending radially into said annular channel and providing a limit for said duct, a duct provided in said annular axial extension having an opening adjacent one end of said boss communicating with said annular duct and being tangentially positioned with respect to and communicating with one end of said helical duct, and duct means connecting said discontinuous annular duct with said longitudinally disposed duct.

* * * * *